(12) United States Patent
Wang et al.

(10) Patent No.: US 11,715,237 B2
(45) Date of Patent: *Aug. 1, 2023

(54) DEEP LEARNING-BASED CAMERA CALIBRATION

(71) Applicant: Motional AD LLC, Boston, MA (US)

(72) Inventors: Yimu Wang, Pittsburgh, PA (US); Wanzhi Zhang, Pittsburgh, PA (US)

(73) Assignee: Motional AD LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/712,473

(22) Filed: Apr. 4, 2022

(65) Prior Publication Data

US 2022/0375129 A1 Nov. 24, 2022

Related U.S. Application Data

(63) Continuation of application No. 17/325,174, filed on May 19, 2021, now Pat. No. 11,295,477.

(51) Int. Cl.
*G06T 7/80* (2017.01)
*G06T 7/50* (2017.01)

(52) U.S. Cl.
CPC .................. *G06T 7/80* (2017.01); *G06T 7/50* (2017.01); *G06T 2207/10028* (2013.01); *G06T 2207/20084* (2013.01); *G06T 2207/30248* (2013.01)

(58) Field of Classification Search
CPC ... G06T 7/80; G06T 7/50; G06T 2207/10028; G06T 2207/20084; G06T 2207/30248; G06T 2207/10024; G06T 2207/10048; G06T 2207/30252

See application file for complete search history.

(56) References Cited

U.S. PATENT DOCUMENTS

| 11,295,477 | B1* | 4/2022 | Wang | G06T 7/50 |
| 2018/0293445 | A1* | 10/2018 | Gao | B60W 10/04 |
| 2020/0005489 | A1* | 1/2020 | Kroeger | G06T 7/80 |
| 2021/0004610 | A1* | 1/2021 | Huang | G01S 17/931 |

(Continued)

OTHER PUBLICATIONS

Li et al., "Deep Learning based Monocular Depth Prediction: Datasets, Methods and Applications," Elsarticle, submitted on Nov. 9, 2020, arXiv:2011.04123, 57 pages.

(Continued)

*Primary Examiner* — Molly Wilburn
(74) *Attorney, Agent, or Firm* — Fish & Richardson P.C.

(57) ABSTRACT

Provided are methods for deep learning-based camera calibration, which can include receiving first and second images captured by a camera, processing the first image using a first neural network to determine a depth of the first image, processing the first image and the second image using a second neural network to determine a transformation between a pose of the camera for the first image and a pose of the camera for the second image, generating a projection image based on the depth of the first image, the transformation of the pose of the camera, and intrinsic parameters of the camera, comparing the second image and the projection image to determine a reprojection error, and adjusting at least one of the intrinsic parameters of the camera based on the reprojection error. Systems and computer program products are also provided.

20 Claims, 9 Drawing Sheets

(56) References Cited

U.S. PATENT DOCUMENTS

| | | | |
|---|---|---|---|
| 2021/0004976 A1* | 1/2021 | Guizilini | G06N 5/04 |
| 2021/0110560 A1* | 4/2021 | Knorr | G06T 7/251 |
| 2021/0118184 A1* | 4/2021 | Pillai | G06T 7/50 |

OTHER PUBLICATIONS

Zhao et al., "Monocular Depth Estimation Based on Deep Learning: An Overview," Sci. China Technol. Sci., Sep. 2020, 63(9):1612-1627.

Godard et al., "Digging into self-supervised monocular depth estimation," Proceedings of the IEEE/CVF International Conference on Computer Vision 2019, Seoul, Korea, Oct. 27-Nov. 2, 2019, 3828-38.

* cited by examiner

DEEP LEARNING-BASED CAMERA CALIBRATION

CROSS-REFERENCE TO RELATED APPLICATION

This application is a continuation of U.S. patent application Ser. No. 17/325,174, filed May 19, 2021 (now allowed), the entire contents of which are incorporated herein by reference.

BACKGROUND

Geometric camera calibration, or simply camera calibration, is the process of estimating the parameters of a camera that produced a given image or video. In an example, camera calibration includes using a calibration rig to determine a correspondence between two-dimensional (2D) image points and three-dimensional (3D) world points, and estimating the camera parameters using the determined correspondence. Once estimated, these parameters can be used to correct for lens distortion, determine the location of the camera within an environment, or measure the size of an object in the environment, among others.

DETAILED DESCRIPTION

Figure 1:
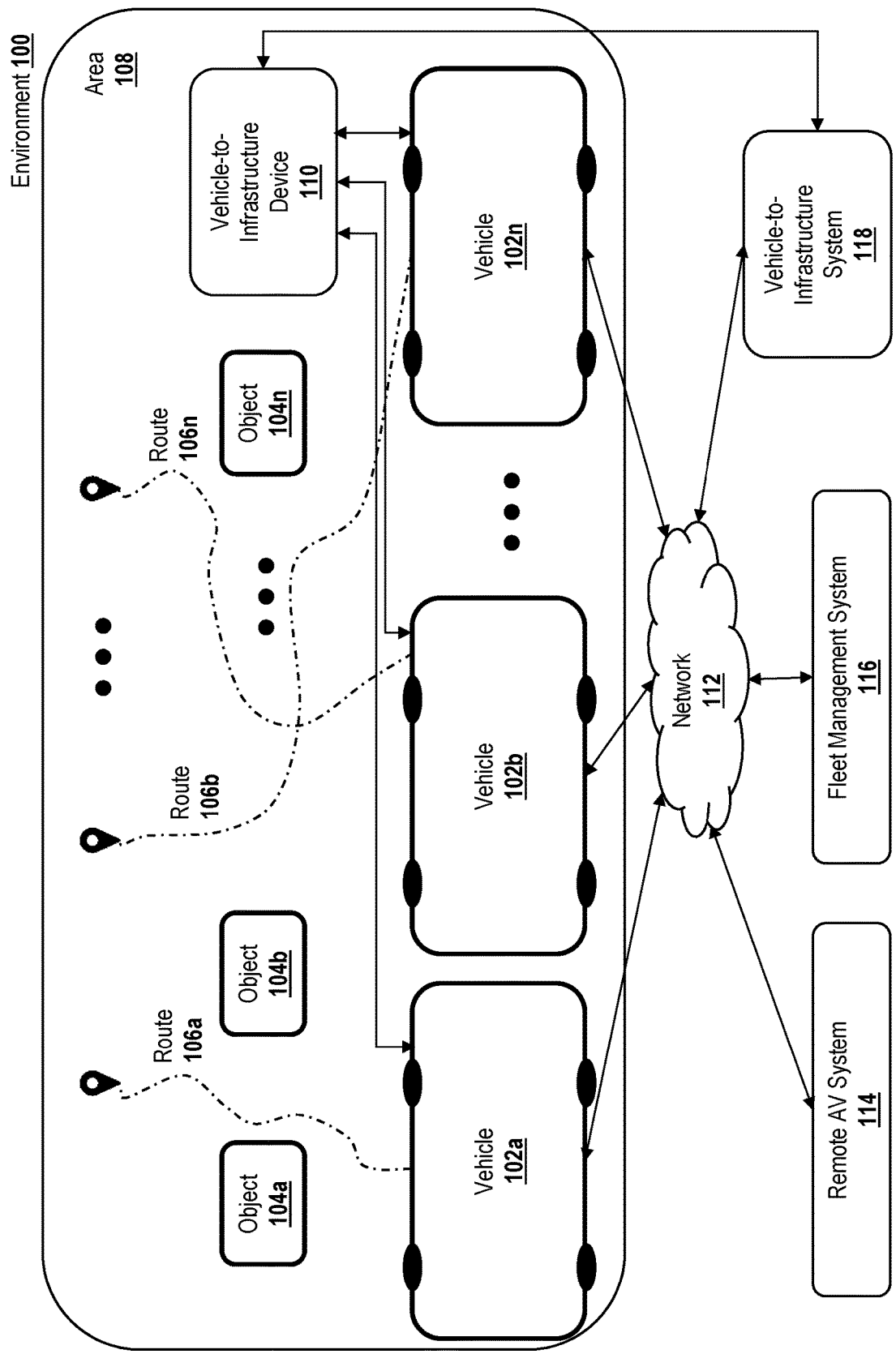
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement deep learning-based camera calibration. In an example, a camera of a computer vision system is calibrated by generating a projection based on a first image and comparing the projection to a second image. For example, first and second images captured by the camera are processed using deep learning models to determine depth information for the first image and a transformation between the first image and the second image. A projection is generated based on the depth information for the first image, the transformation between the first image and the second image, and intrinsic parameters of the camera. The projection and the second image are compared to determine a reprojection error at some or all points of the projection. Parameters of the deep learning models or the camera, or both, are adjusted based on the reprojection error to reduce the error and calibrate the camera. In an embodiment, the camera is determined to be calibrated when the reprojection error satisfies a threshold.

By virtue of the implementation of systems, methods, and computer program products described herein, a camera calibration process can be updated, resulting in more accurate calibration of the camera. In general, the described techniques allow for a camera to be calibrated with less constraints relative to certain calibration methods. For example, unlike methods which require a predefined sequence of images to perform calibration, the techniques described can be used to perform calibration on any arbitrary image or video sequence. In addition, the techniques described do not require a calibration rig (e.g., a chessboard, a checkerboard, a target, a set of symbols, etc.). As such, the techniques described can be performed in real-time, which significantly reduces requirements associated with certain calibration processes (e.g., that cameras be located in a particular environment such as a calibration room, that certain calibration rigs be used, etc.). For instance, the techniques described here allow for a camera associated with a vision system of a vehicle to be calibrated in real-time (e.g., during vehicle operation) without requiring the vehicle to navigate to a designated calibration rig to capture a predefined sequence of calibration images. The techniques describe here can also be used to improve calibration of other sensors, such as an inertial measurement unit (IMU). For example, one or more neural networks can be used to model the IMU or other sensor and identify calibration parameters for the model that minimize the error between the output of the model and a reference measurement.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, and V2I system 118. Vehicles 102a-102n, vehicle-to-infrastructure (V2I) device 110, network 112, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
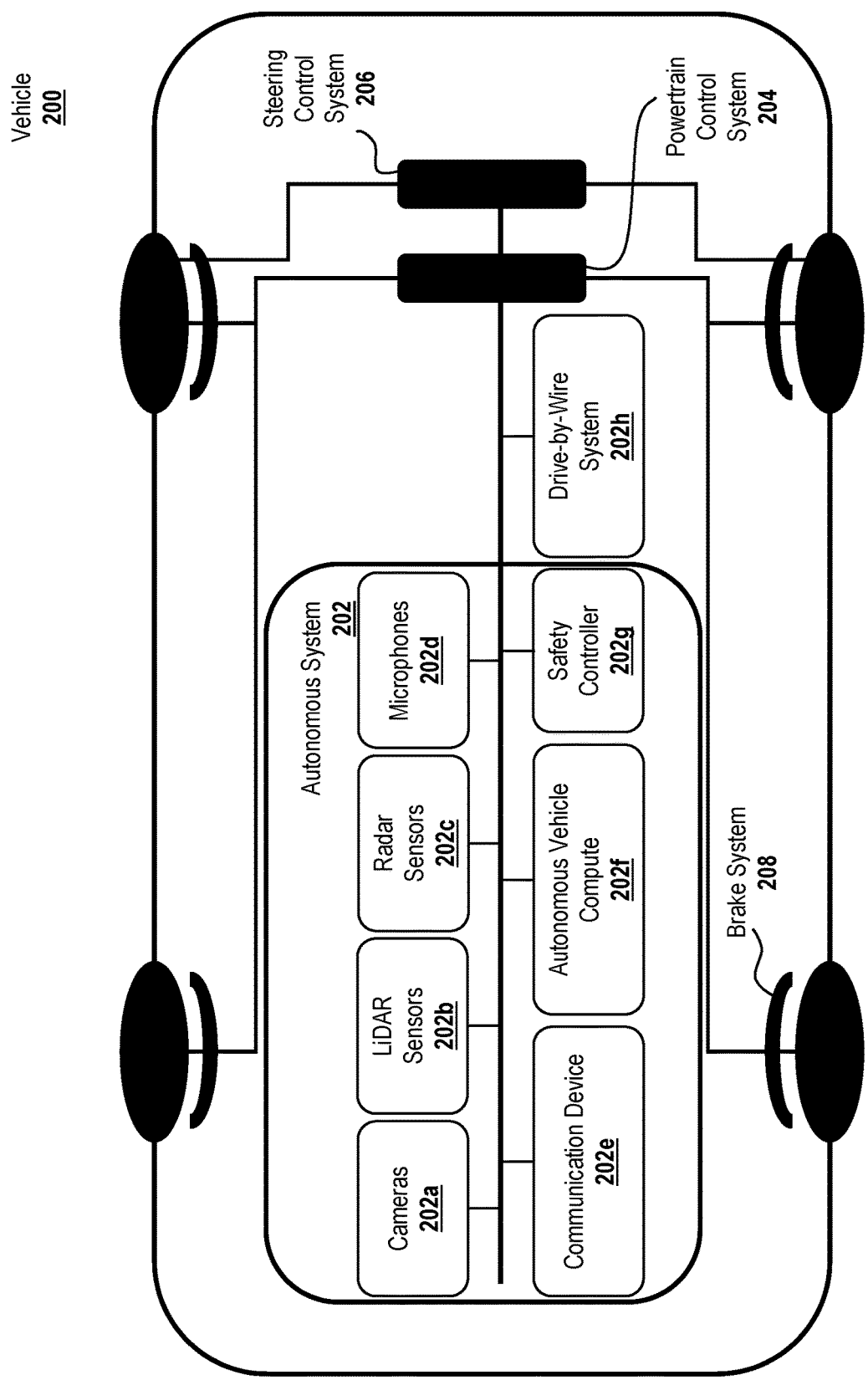
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
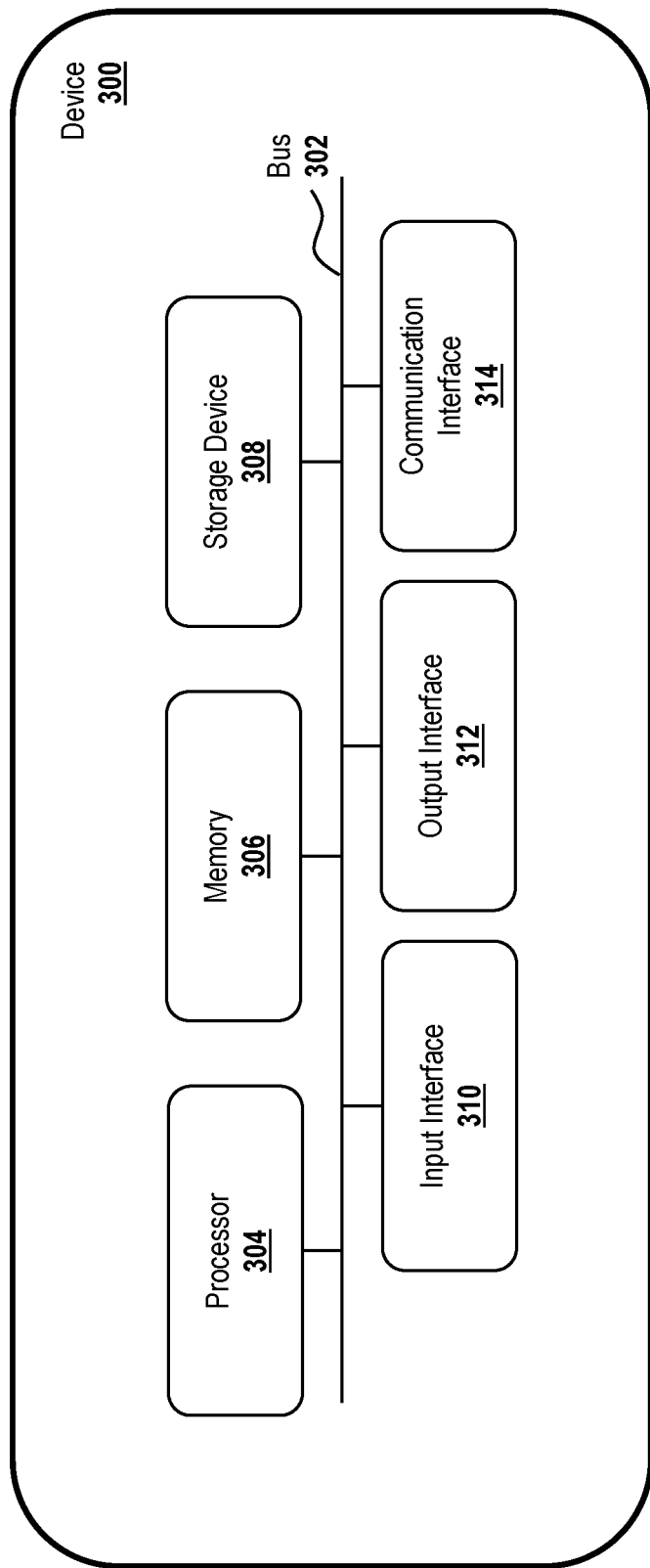
FIG. 3 is a diagram of components of one or more devices and/or systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, and/or safety controller 202g via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum. In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. In some embodiments, device 300 corresponds to at least one device of vehicles 102 (e.g., at least one device of a system of vehicles 102), at least one device of V2I device 110 and/or V2I system 118, at least one device of remote AV system 114, at least one device of fleet management system 116, and/or at least one device of network 112 (e.g., one or more devices of a system of network 112). In some embodiments, one or more devices of vehicles 102 (e.g., one or more devices of a system of vehicles 102), V2I device 110, remote AV system 114, fleet management system 116, V2I system 118, and/or network 112 (e.g., one or more devices of a system of network 112) include at least one device 300 and/or at least one component of device 300. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
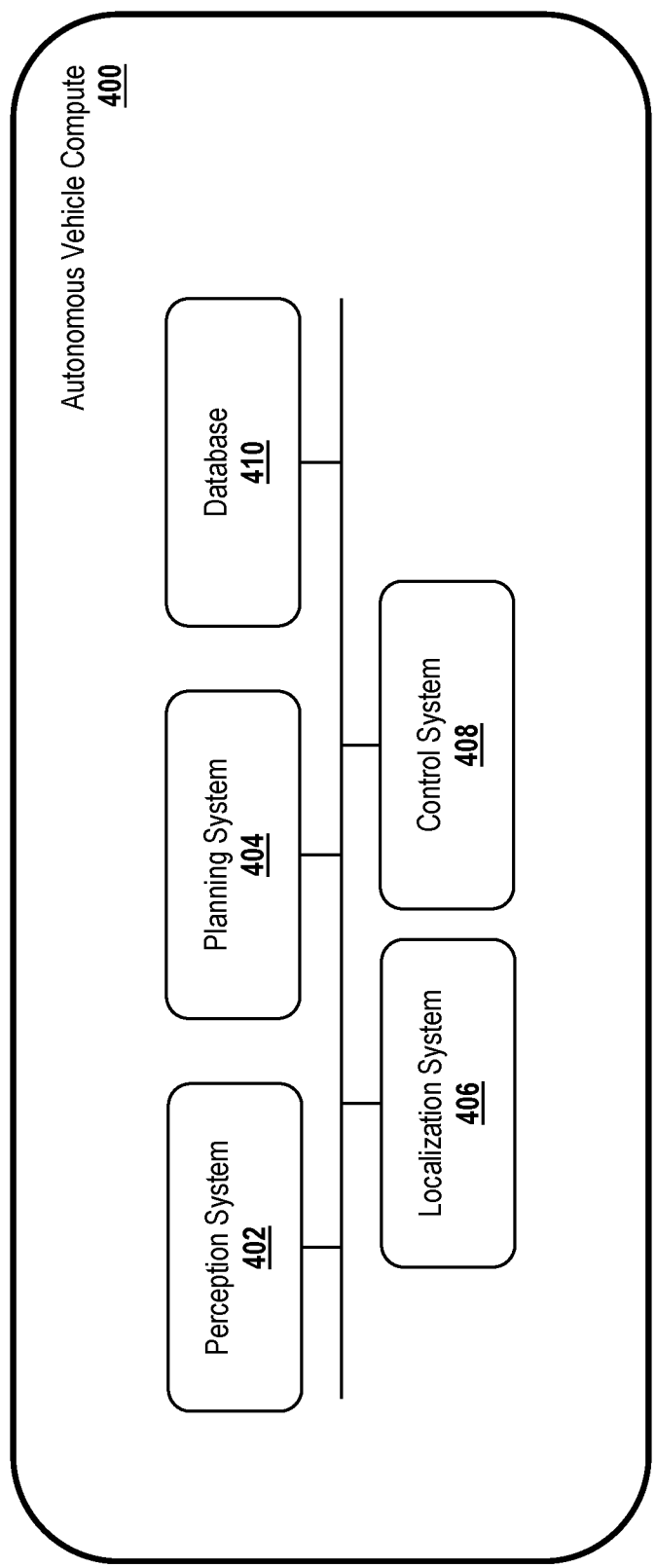
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202*a*), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202*b*). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202*h*, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, and/or control system 408 implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, and/or control system 408 implement at least one machine learning model alone or in combination with one or more of the above-noted systems. In some examples, perception system 402, planning system 404, localization system 406, and/or control system 408 implement at least one machine learning model as part of a pipeline (e.g., a pipeline for identifying one or more objects located in an environment and/or the like). An example of an implementation of a machine learning model is included below with respect to FIGS. 4B-4D.

Database 410 stores data that is transmitted to, received from, and/or updated by perception system 402, planning system 404, localization system 406 and/or control system 408. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
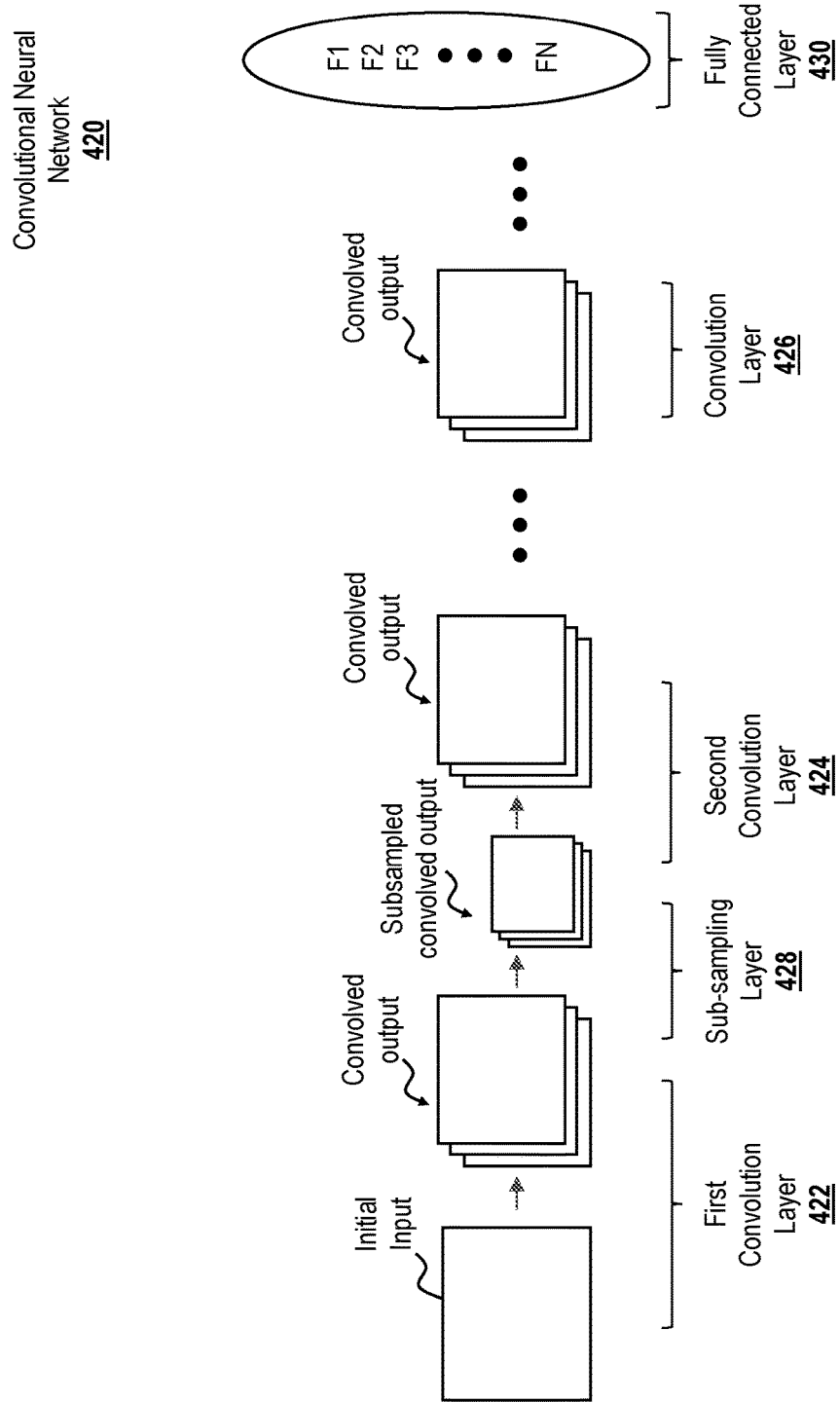
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, and/or control system 408. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function (as described below with respect to FIGS. 4C and 4D), CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like). A detailed description of convolution operations is included below with respect to FIG. 4C.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 402 normalizing sensor data (e.g., image data, LiDAR data, radar data, and/or the like).

In some embodiments, CNN 420 generates an output based on perception system 402 performing convolution operations associated with each convolution layer. In some examples, CNN 420 generates an output based on perception system 402 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 4C:
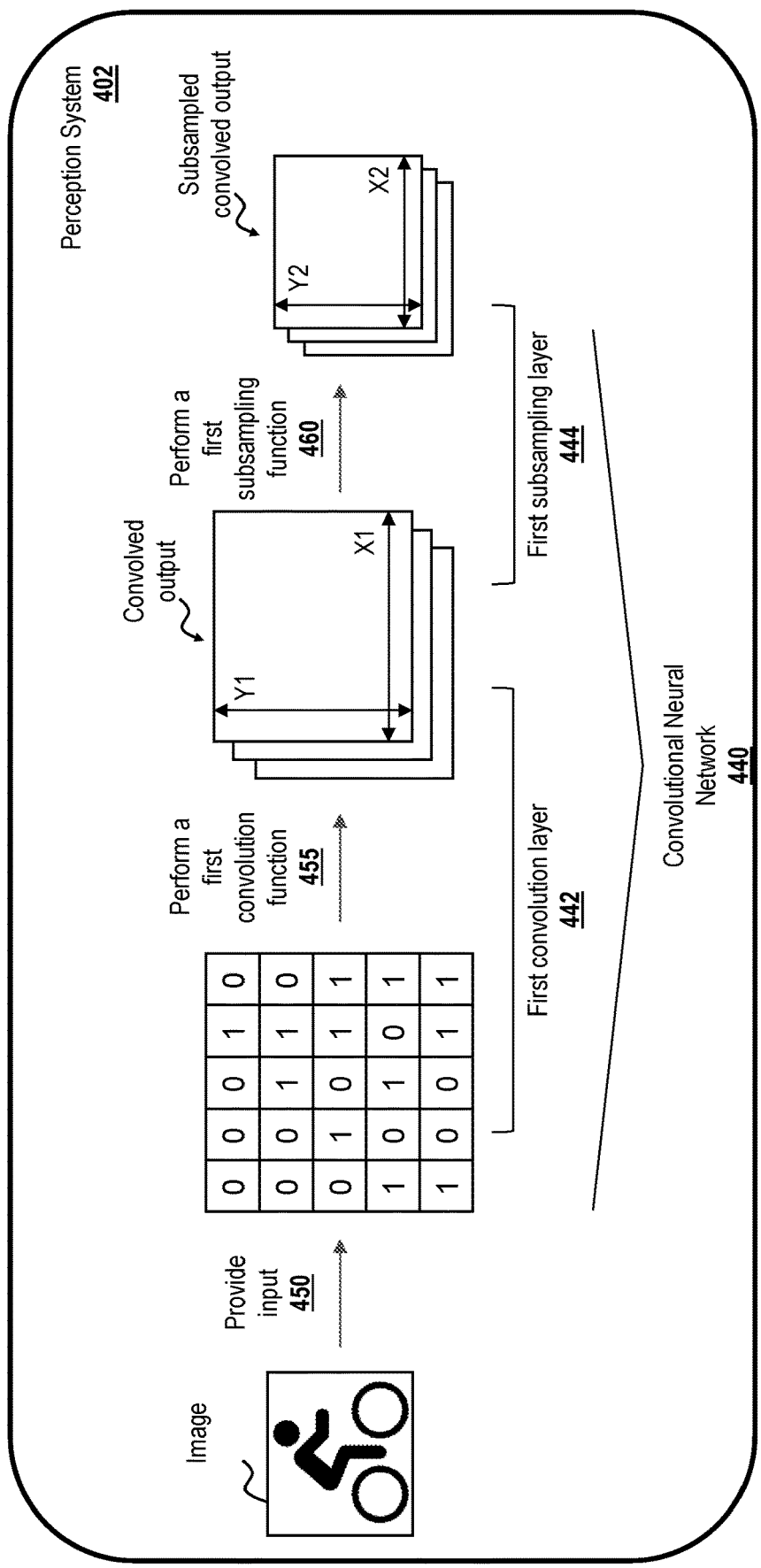
FIGS. 4C and 4D are a diagram illustrating example operation of a neural network.
Figure 4D:
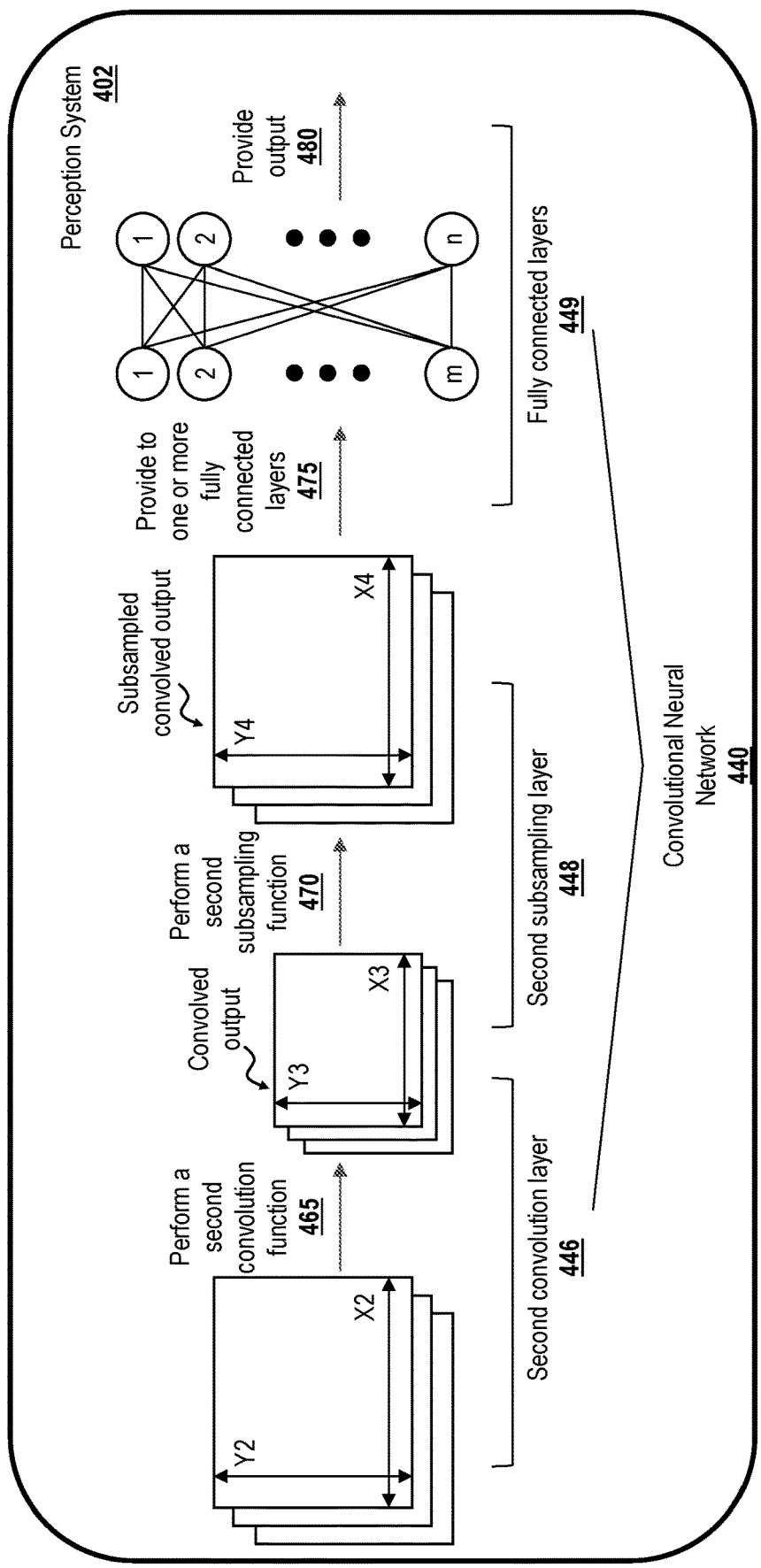

Referring now to FIGS. 4C and 4D, illustrated is a diagram of example operation of CNN 440 by perception system 402. In some embodiments, CNN 440 (e.g., one or more components of CNN 440) is the same as, or similar to, CNN 420 (e.g., one or more components of CNN 420) (see FIG. 4B).

At step 450, perception system 402 provides data associated with an image as input to CNN 440 (step 450). For example, as illustrated, perception system 402 provides the data associated with the image to CNN 440, where the image is a greyscale image represented as values stored in a two-dimensional (2D) array. In some embodiments, the data associated with the image may include data associated with a color image, the color image represented as values stored in a three-dimensional (3D) array. Additionally, or alternatively, the data associated with the image may include data associated with an infrared image, a radar image, and/or the like.

At step 455, CNN 440 performs a first convolution function. For example, CNN 440 performs the first convolution function based on CNN 440 providing the values representing the image as input to one or more neurons (not explicitly illustrated) included in first convolution layer 442. In this example, the values representing the image can correspond to values representing a region of the image (sometimes referred to as a receptive field). In some embodiments, each neuron is associated with a filter (not explicitly illustrated). A filter (sometimes referred to as a kernel) is representable as an array of values that corresponds in size to the values provided as input to the neuron. In one example, a filter may be configured to identify edges (e.g., horizontal lines, vertical lines, straight lines, and/or the like). In successive convolution layers, the filters associated with neurons may be configured to identify successively more complex patterns (e.g., arcs, objects, and/or the like).

In some embodiments, CNN 440 performs the first convolution function based on CNN 440 multiplying the values provided as input to each of the one or more neurons included in first convolution layer 442 with the values of the filter that corresponds to each of the one or more neurons. For example, CNN 440 can multiply the values provided as input to each of the one or more neurons included in first convolution layer 442 with the values of the filter that corresponds to each of the one or more neurons to generate a single value or an array of values as an output. In some embodiments, the collective output of the neurons of first convolution layer 442 is referred to as a convolved output. In some embodiments, where each neuron has the same filter, the convolved output is referred to as a feature map.

In some embodiments, CNN 440 provides the outputs of each neuron of first convolutional layer 442 to neurons of a downstream layer. For purposes of clarity, an upstream layer can be a layer that transmits data to a different layer (referred to as a downstream layer). For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of first subsampling layer 444. In some embodiments, CNN 440 adds a bias value to the aggregates of all the values provided to each neuron of the downstream layer. For example, CNN 440 adds a bias value to the aggregates of all the values provided to each neuron of first subsampling layer 444. In such an example, CNN 440 determines a final value to provide to each neuron of first subsampling layer 444 based on the aggregates of all the values provided to each neuron and an activation function associated with each neuron of first subsampling layer 444.

At step 460, CNN 440 performs a first subsampling function. For example, CNN 440 can perform a first subsampling function based on CNN 440 providing the values output by first convolution layer 442 to corresponding neurons of first subsampling layer 444. In some embodiments, CNN 440 performs the first subsampling function based on an aggregation function. In an example, CNN 440 performs the first subsampling function based on CNN 440 determining the maximum input among the values provided to a given neuron (referred to as a max pooling function). In another example, CNN 440 performs the first subsampling function based on CNN 440 determining the average input among the values provided to a given neuron (referred to as an average pooling function). In some embodiments, CNN 440 generates an output based on CNN 440 providing the values to each neuron of first subsampling layer 444, the output sometimes referred to as a subsampled convolved output.

At step 465, CNN 440 performs a second convolution function. In some embodiments, CNN 440 performs the second convolution function in a manner similar to how CNN 440 performed the first convolution function, described above. In some embodiments, CNN 440 performs the second convolution function based on CNN 440 providing the values output by first subsampling layer 444 as input to one or more neurons (not explicitly illustrated) included in second convolution layer 446. In some embodiments, each neuron of second convolution layer 446 is associated with a filter, as described above. The filter(s) associated with second convolution layer 446 may be configured to identify more complex patterns than the filter associated with first convolution layer 442, as described above.

In some embodiments, CNN 440 performs the second convolution function based on CNN 440 multiplying the values provided as input to each of the one or more neurons included in second convolution layer 446 with the values of the filter that corresponds to each of the one or more neurons. For example, CNN 440 can multiply the values provided as input to each of the one or more neurons included in second convolution layer 446 with the values of the filter that corresponds to each of the one or more neurons to generate a single value or an array of values as an output.

In some embodiments, CNN 440 provides the outputs of each neuron of second convolutional layer 446 to neurons of a downstream layer. For example, CNN 440 can provide the outputs of each neuron of first convolutional layer 442 to corresponding neurons of a subsampling layer. In an example, CNN 440 provides the outputs of each neuron of first convolutional layer 442 to corresponding neurons of second subsampling layer 448. In some embodiments, CNN 440 adds a bias value to the aggregates of all the values provided to each neuron of the downstream layer. For example, CNN 440 adds a bias value to the aggregates of all the values provided to each neuron of second subsampling layer 448. In such an example, CNN 440 determines a final value to provide to each neuron of second subsampling layer 448 based on the aggregates of all the values provided to each neuron and an activation function associated with each neuron of second subsampling layer 448.

At step 470, CNN 440 performs a second subsampling function. For example, CNN 440 can perform a second subsampling function based on CNN 440 providing the values output by second convolution layer 446 to corresponding neurons of second subsampling layer 448. In some embodiments, CNN 440 performs the second subsampling function based on CNN 440 using an aggregation function. In an example, CNN 440 performs the first subsampling function based on CNN 440 determining the maximum input or an average input among the values provided to a given neuron, as described above. In some embodiments, CNN 440 generates an output based on CNN 440 providing the values to each neuron of second subsampling layer 448.

At step 475, CNN 440 provides the output of each neuron of second subsampling layer 448 to fully connected layers 449. For example, CNN 440 provides the output of each neuron of second subsampling layer 448 to fully connected layers 449 to cause fully connected layers 449 to generate an output. In some embodiments, fully connected layers 449 are configured to generate an output 480 associated with a prediction (sometimes referred to as a classification). The prediction may include an indication that an object included in the image provided as input to CNN 440 includes an object, a set of objects, and/or the like. In some embodiments, perception system 402 performs one or more operations and/or provides the data associated with the prediction to a different system, described herein.

Figure 5:
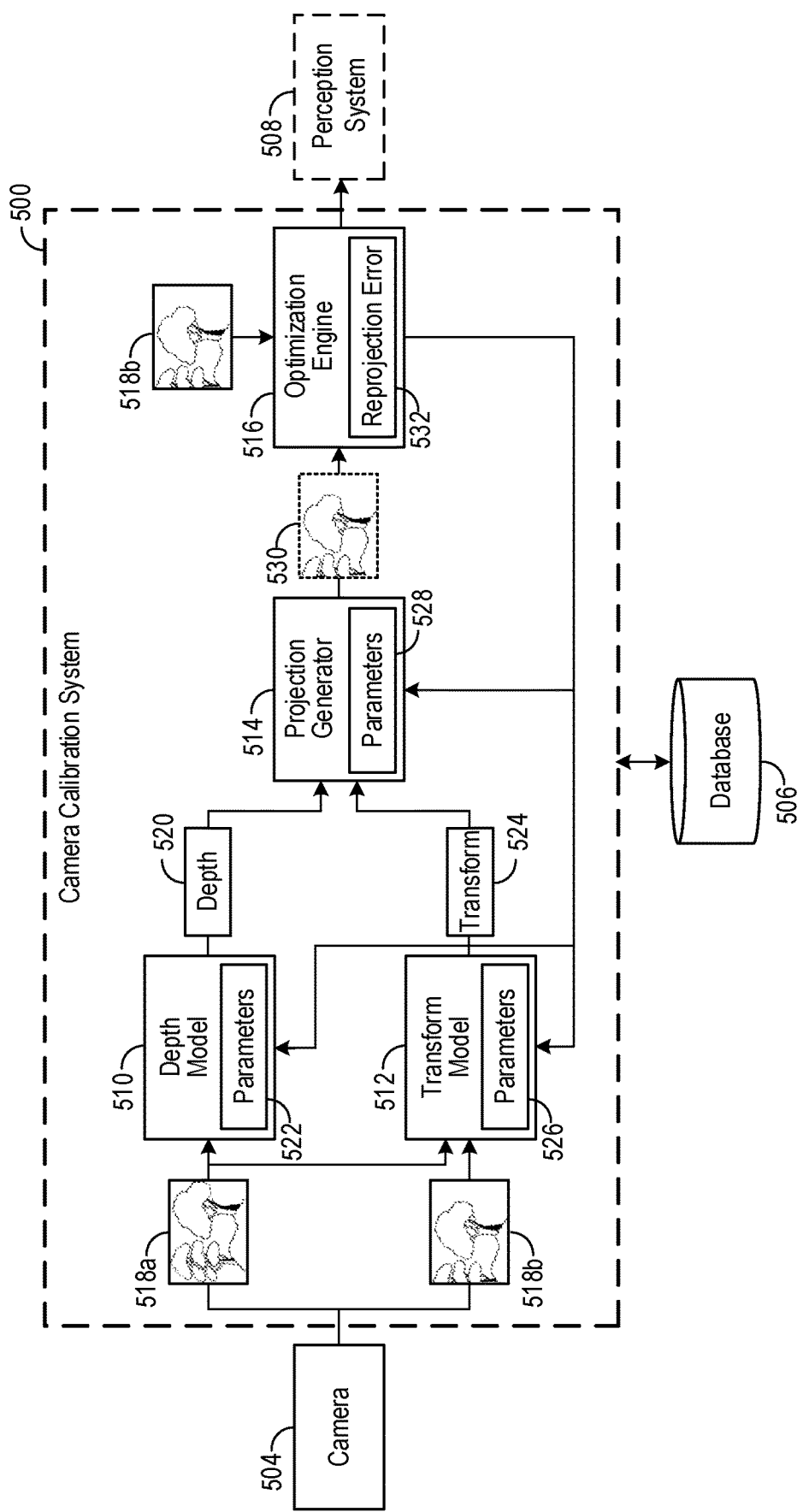
FIG. 5 is a diagram of a system for deep learning-based camera calibration.

Referring now to FIG. 5, a diagram of a camera calibration system 500 for deep learning-based camera calibration is illustrated. In some embodiments, the camera calibration system 500 is in communication with a camera 504, a database 506, and, optionally, a perception system 508. In some embodiments, the camera calibration system 500 is the same as, similar to, or part of autonomous system, such as AV compute 202*f* of autonomous system 202, AV compute 400, or a component thereof (e.g., perception system 402). In some embodiments, the camera calibration system 500 is the same as, similar to, or part of a remote autonomous system, such as remote AV system 114. In some embodiments, the camera 504 is the same as or similar to cameras 202*a*, the database 506 is the same as or similar to database 410, and/or the perception system 508 is the same as or similar to perception system 402.

In general, the camera calibration system 500 processes images captured by the camera 504 using a depth model 510, a transform model 512, a projection generator 514, and an optimization engine 516 to calibrate the camera 504. As used herein, the term "calibrate" refers to the determination or estimation of one or more camera parameters, such as intrinsic camera parameters, extrinsic camera parameters, or combinations of them, among others. Intrinsic camera parameters relate the camera's coordinates to coordinates of an image point (e.g., pixel coordinates) and can include, for example, focal length, principal point (sometimes referred to as the optical center, or the point on an image plane that intersects with an axis projected from the camera center), skew coefficient (e.g., a coefficient defining the angle between the x and y pixel axes), image sensor format (e.g., shape and/or size of a pixel produced by the camera's image sensor), and distortion coefficient (e.g., a coefficient defining radial and/or tangential distortions, such as those caused by a lens of the camera), among others. Extrinsic camera parameters relate the camera's coordinates to world coordinates and can include, for example, translation (e.g., a translation vector) and rotation (e.g., a rotation matrix), among others. Once the camera calibration system 500 determines that the camera parameters have been estimated within a threshold level of accuracy (as described below), the camera 504 is deemed to be calibrated. The parameters for the calibrated camera 504 can then be stored (e.g., in the database 506) and/or provided to one or more other vehicle systems or components, such as the perception system 508 for use in detecting and measuring objects.

In operation, the camera calibration system 500 receives at least a first image 518*a* and a second image 518*b* captured by the camera 504. Each of the images 518*a*, 518*b* (referred to collectively as images 518) can be captured at a different position or orientation (sometimes referred to as a pose) of the camera 504. For example, in some embodiments, the camera 504 is video camera, and the images 518 are consecutive (or near consecutive) frames of a video captured while a vehicle (e.g., the vehicle 102 or the vehicle 200) coupled to the camera 504 is in motion. In some embodiments, the camera 504 is a still image camera, and the first image 518*a* is captured while the camera 504 is at a first position or orientation, and second image 518*b* is captured while the camera is at a second position or orientation. In some embodiments, the distance between the first position (or orientation) and the second position (or orientation) satisfies a threshold associated with calibration of the camera (e.g., a threshold distance such that a variation in at least one camera parameter, such as an intrinsic camera parameter, is observable through analysis of the images). In some embodiments, the capture of the different images 518 is automated by the vehicle or vehicle system by, for example, the vehicle or vehicle system causing the camera 504 to capture the first image 518*a* at a first position of the vehicle, causing the vehicle to autonomously travel to a second position, and causing the camera 504 to capture the second image 518*b* at the second position of the vehicle.

The first image 518*a* is provided to the depth model 510 of the camera calibration system 500, which processes the first image 518*a* to predict a depth value for each point (e.g., pixel) of the image from the viewpoint of the camera 504. Using the predicted depth values, the depth model 510 produces a depth map 520 (or point cloud) representing a distance of each point of the image 518*a* from the position of the camera 504. In some embodiments, the depth model 510 includes one or more neural networks, such as one or more CNNs (e.g., the CNN 420 or the CNN 440). In this example, the depth model 510 receives the first image 518*a* as an input. In some embodiments, the image 518*a* is a greyscale image represented by values stored in a 2D array. In some embodiments, the image 518*a* is a color (RGB) image represented by values stored in a 3D array. The depth model 510 processes the first image 518*a* using one or more layers and in accordance with one or more parameters 522 (e.g., model weights and/or biases). For example, the depth model 510 can extract features from the image 518*a* and use techniques such as deconvolution or dilated convolution, among others, to produce the depth map 520. Based on this processing, the depth model 510 predicts a depth value for each point of the image 518*a* to produce a depth map 520 from the viewpoint of the camera 504. In some embodiments, the depth model 510 is trained and the one or more parameters 522 are updated through an optimization algorithm (e.g., stochastic gradient descent with backpropagation) applied by the optimization engine 516, as described below.

The transform model 512 of the camera calibration system 500 receives and processes the first and second images 518 to predict a transformation 524 between the pose of the camera 504 for the first image 518*a* and a pose of the camera 504 for the second image 518*b*. The transformation 524 can include a transformation matrix with values representing a 2D or 3D translation, rotation, and/or other transformations in the pose of the camera 504 as derived from the first and second images 518. In some embodiments, the transformation 524 can represent a real-world position of the camera 504 at a time the second image 518*b* is captured relative to a known or assumed position of the camera 504 at a time the first image 518*a* is captured. In some embodiments, such as when the camera 504 is disposed at a vehicle, the transform model 512 can receive information about motion of the vehicle (e.g., distance, heading, etc.) between capture of the first image 518a and the second image 518b, and can use this information alone or in combination with analysis of the images 518 to determine the transformation 524.

In some embodiments, the transform model 512 includes one or more neural networks, such as one or more CNNs (e.g., the CNN 420 or the CNN 440). In this example, the transform model 512 receives the first and second images 518 as inputs. As noted above, the images 518 can be greyscale images represented by values stored in 2D arrays, or color (RGB) images represented by values stored in 3D arrays. The transform model 512 processes the images 518 using one or more layers and in accordance with one or more parameters 526 (e.g., model weights and/or biases). For example, the transform model 512 can extract features from the images 518 and can compare corresponding features in the images 518 to identify one or more transformations to the pose of the camera 504. Based on this processing, the transform model 512 predicts a transformation 524 (e.g., a transformation matrix) between the pose of the camera 504 for the first image 518a and a pose of the camera 504 for the second image 518b. In some embodiments, the transform model 512 is trained and the one or more parameters 526 are updated through an optimization algorithm (e.g., stochastic gradient descent with backpropagation) applied by the optimization engine 516, as described below.

The depth map 520 and transformation 524 are provided to the projection generator 514 of the camera calibration system 500. The projection generator 514 applies the transformation 524 to the depth map 520 for the first image 518a to produce a predicted depth map for the second image 518b (e.g., a predicted depth map from a pose of the camera 504 for the second image 518b). The projection generator 514 then applies one or more parameters 528 to project the predicted depth map for the second image 518b into the image frame, thereby producing a projection image 530 of the second image 518b.

In some embodiments, the one or more parameters 528 are intrinsic parameters of the camera 504, and the projection generator 514 generates the projection image 530 according to a camera model, such as a pinhole camera model. For example, the projection generator 514 can determine values for each point (e.g., pixel) of the projection image 530 according to the equation $$\begin{bmatrix} x \\ y \\ 1 \end{bmatrix} = K[R\ T] \begin{bmatrix} X \\ Y \\ Z \end{bmatrix},$$

where x,y are the projection image coordinates, K is an intrinsic camera parameter matrix, [R T] is an extrinsic camera parameter matrix including rotation and translation, and $$\begin{bmatrix} X \\ Y \\ Z \end{bmatrix}$$

are the world coordinates. In this example, the extrinsic camera parameter matrix can be known (e.g., from the transformation 524 or otherwise), the world coordinates can be derived from the predicted depth map for the second image 518b, and the intrinsic camera parameter matrix can be determined from the parameters 528.

The projection image 530 is provided to the optimization engine 516 of the camera calibration system 500. The optimization engine 516 compares the projection image 530 with a ground truth image (e.g., the second image 518b) to determine a reprojection error 532. For example, the optimization engine 516 can perform a pixel-wise comparison of the projection image 530 and the second image 518b to determine a distance (e.g., a Euclidean distance) between each point of the projection image 530 and a corresponding point of the second image 518b. In some embodiments, the optimization engine 516 combines (e.g., sums, averages, etc.) the determined distances to determine the reprojection error 532.

The optimization engine 516 uses the reprojection error 532 to optimize one or more parameters of the camera calibration system 500, such as one or more of the parameters 522 of the depth model 510, one or more of the parameters 526 of the transform model 512, and/or one or more of the parameters 528 (e.g., intrinsic camera parameters) of the projection generator 514. For example, the optimization engine 516 defines a cost or loss function, such as a mean squared error function, that takes one or more of the parameters 522, 526, 528 as inputs and relates them to the reprojection error 532. The optimization engine 516 can then apply one or more optimization algorithms, such as a gradient descent, a stochastic gradient descent algorithm, adaptive movement estimation, adaptive learning rate method, Newton's method, or combinations of them, among others, to the cost function to identify values for the parameters 522, 526, 528 that result in a minimum value of the reprojection error 532.

For example, when a gradient descent or stochastic gradient descent optimization algorithm is used, the optimization engine 516 can calculate a gradient of the cost function with respect to the parameters 522, 526, 528. In some embodiments, a backpropagation or other automatic differentiation algorithm can be used to calculate the gradient of the cost function with respect to the parameters depending on, for example, which parameters are being optimized (e.g., if parameters for hidden layers, such as hidden layers of the depth model 510 or transform model 512 are being optimized, a backpropagation algorithm can be used). Based on the gradient, the optimization engine 516 can adjust values of one or more of the parameters 522, 526, 528 to reduce the reprojection error 532. In some embodiments, the adjustment of each parameter is controlled by a step size or learning rate, which can vary among the parameters.

The optimization engine 516 can repeat the optimization process until the loss function (e.g., reprojection error) is minimized, a maximum number of candidate solutions are evaluated, or some other stop condition is satisfied. For example, in some embodiments, the optimization engine 516 compares the reprojection error 532 with a threshold value to determine whether threshold has been satisfied. If the threshold is satisfied, the camera 504 can be deemed calibrated and one or more of the parameters 522, 526, 528 can be stored in the database 506. In some embodiments, one or more of the parameters, such as the parameters 528 (representing, e.g., the intrinsic camera parameters) are provided to the perception system 508 and/or another system or device described herein. The perception system 508 (or another system or device) can use these intrinsic parameters to perform various computer vision tasks, such as detecting and measuring objects.

Figure 6:
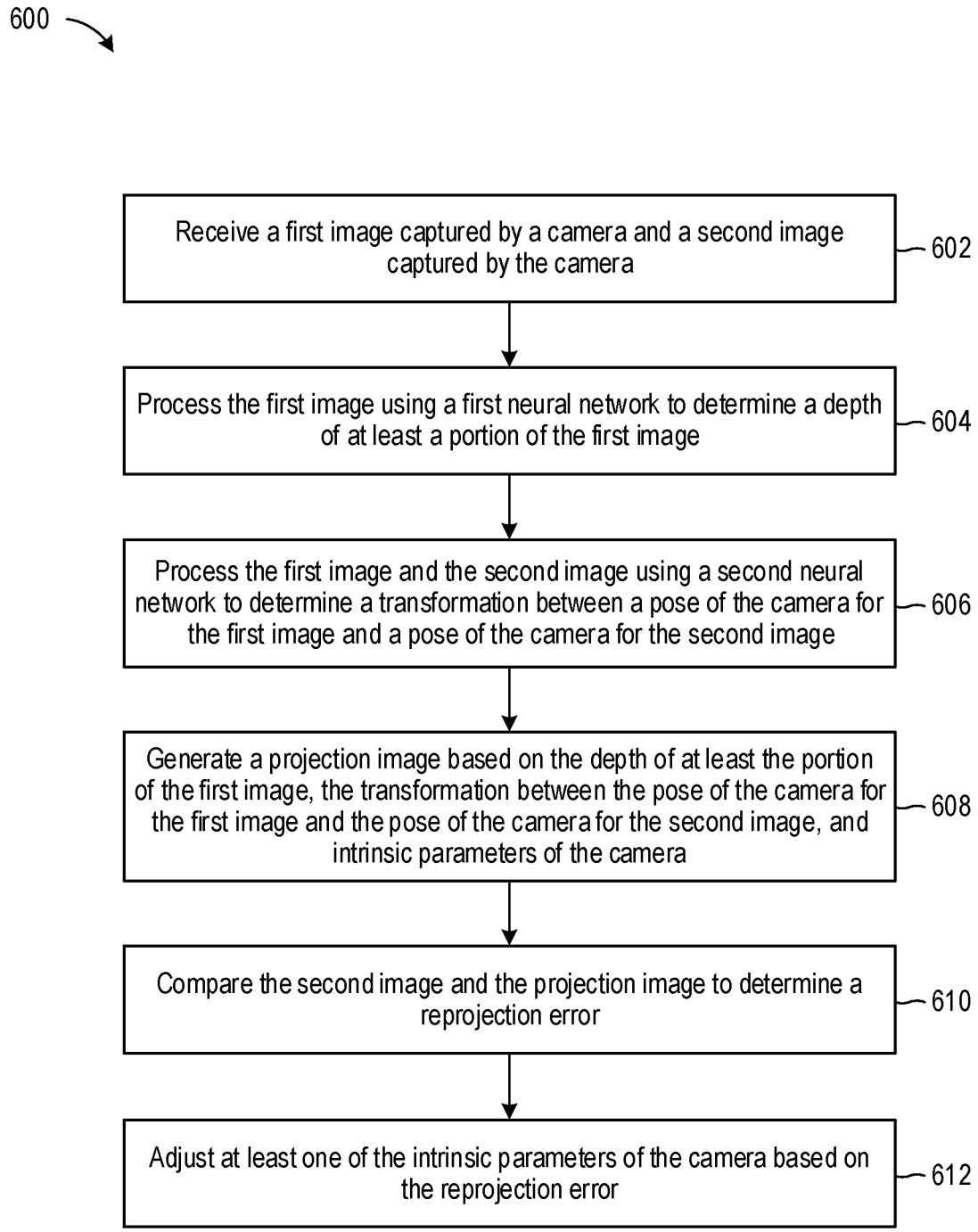
FIG. 6 is a flowchart of a process for deep learning-based camera calibration.

Referring now to FIG. 6, illustrated is a flowchart of a process 600 for deep-learning based camera calibration. In some embodiments, one or more of the steps described with respect to process 600 are performed (e.g., completely, partially, and/or the like) by the camera calibration system 500. Additionally, or alternatively, in some embodiments one or more steps described with respect to process 600 are performed (e.g., completely, partially, and/or the like) by another device or group of devices separate from or including the camera calibration system 500, such as AV compute 202f of autonomous system 202, AV compute 400 or a component thereof (e.g., perception system 402), remote AV system 114, or combinations of them, among others.

Operations of the process 600 include receiving a first image captured by a camera and a second image captured by the camera (block 602). The first image and the second image can be received, for example, from the camera 504 by at least one processor of the camera calibration system 500. In some embodiments, the first image is captured while the camera is positioned at a first location and the second image is captured while the camera is positioned at a second location different from the first location. A distance between the first location and the second location can satisfies a threshold associated with calibration of the camera. In some embodiments, the first and second images are consecutive (or near consecutive) frames in a video. In some embodiments, the first and second images are received in response to a trigger, such as a vehicle, a user of the vehicle, or a remote operator of the vehicle including the camera initiating a camera calibration process.

The first image is processed using a first neural network to determine a depth of at least a portion of the first image (block 604). The first neural network can include, for example, a CNN (e.g., CNN 420 or CNN 440) and can be part of the depth model 510. In some embodiments, the depth of the first image is measured from a viewpoint or position of the camera and is represented by a point cloud or depth map, such as the depth map 520.

The first image and the second image are processed using a second neural network to determine a transformation between a pose of the camera for the first image and a pose of the camera for the second image (block 606). The second neural network can include, for example, a CNN (e.g., CNN 420 or CNN 440) and can be part of the transform model 512. In some embodiments, the transformation (e.g., the transformation 524) can include a transformation matrix with values representing a 2D or 3D translation, rotation, and/or other transformations in the pose of the camera as derived from the first and second images.

A projection image is generated based on the depth of at least the portion of the first image, the transformation between the pose of the camera for the first image and the pose of the camera for the second image, and intrinsic parameters of the camera (block 608). In some embodiments, generating the projection image (e.g., the projection image 530) includes applying (e.g., by the projection generator 514) the transformation to the depth of at least the portion of the first image to predict a depth of at least a portion of the second image, and processing the predicted depth of at least the portion of the second image with the intrinsic parameters of the camera (e.g., the parameters 528) to generate the projection image. The intrinsic parameters of the camera can include, for example, focal length, principal point, skew coefficient, image sensor format (e.g., pixel shape and/or pixel size), and distortion coefficient, among others.

The second image and the projection image are compared to determine a reprojection error at some or all points of the images (block 610). In some embodiments, the reprojection error (e.g., the reprojection error 532) is determined (e.g., by the optimization engine 516) through a pixel-wise comparison of the projection image and the second image to determine a distance (e.g., a Euclidean distance) between each point of the projection image and a corresponding point of the second image. In some embodiments, the determined distances are combined (e.g., summed, averaged, etc.) to determine the reprojection error.

Based on the reprojection error, at least one of the intrinsic parameters of the camera are adjusted (block 612). In some embodiments, adjusting at least one of the intrinsic parameters of the camera includes applying an optimization algorithm (e.g., gradient descent or stochastic gradient descent, among others, and optionally with backpropagation) to a cost function that relates the intrinsic parameters to the reprojection error and is configured to minimize the cost function by adjusting at least one of the intrinsic parameters. In some embodiments, the optimization is continuously applied and the intrinsic parameters (and/or other parameters) adjusted until the reprojection error satisfies a predetermined threshold. When the reprojection error satisfied the predetermined threshold, the camera is determined to be calibrated and the intrinsic parameters (and/or other parameters) can be stored (e.g., in the database 506) and/or provided to other systems or devices described herein, such as the perception system 508 for using in computer vision tasks.

In some embodiments, the process 600 includes adjusting at least one parameter of the first neural network or the second neural network based on the reprojection error. Adjusting at least one parameter of the first neural network or the second neural network can include applying an optimization algorithm to a cost function that relates the at least one parameter of the first neural network or the second neural network to the reprojection error. The optimization algorithm can be configured to minimize the cost function by adjusting the at least one parameter of the first neural network or the second neural network.

Various modifications of the techniques described here are possible. For example, the techniques described here can be used to improve calibration of other sensors, such as an IMU, radar sensors, LiDAR sensors, or other sensors. For example, one or more neural networks can be used to model the IMU or other sensor and identify calibration parameters for the model that minimize the error between the output of the model and a reference measurement.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A computer-implemented method, comprising:
receiving, using at least one processor, a first image captured by a camera and a second image captured by the camera;
processing, using the at least one processor, the first image and the second image using at least one neural network to:
determine a depth of at least a portion of the first image;
determine a transformation between the first image and the second image;
generating, using the at least one processor, a projection image based on the depth of at least the portion of the first image, the transformation between the first image and the second image, and intrinsic parameters of the camera;
comparing, using the at least one processor, the second image and the projection image to determine a reprojection error; and
adjusting, using the at least one processor, at least one of the intrinsic parameters of the camera based on the reprojection error.

2. The method of claim 1, wherein receiving the first image captured by the camera and the second image captured by the camera comprises:
receiving the first image while the camera is positioned at a first location; and
receiving the second image while the camera is positioned at a second location different from the first location,
wherein a distance between the first location and the second location satisfies a threshold associated with calibration of the camera.

3. The method of claim 1, wherein generating the projection image comprises:
applying the transformation to the depth of at least the portion of the first image to predict a depth of at least a portion of the second image; and
processing the predicted depth of at least the portion of the second image with the intrinsic parameters of the camera to generate the projection image.

4. The method of claim 1, wherein comparing the second image and the projection image to determine the reprojection error comprises:
determining a distance between each point of the second image and a corresponding point of the projection image; and
combining the distance between each point of the second image and the corresponding point of the projection image to determine the reprojection error.

5. The method of claim 1, wherein adjusting at least one of the intrinsic parameters of the camera comprises applying an optimization algorithm to a cost function that relates the intrinsic parameters to the reprojection error,
wherein the optimization algorithm is configured to minimize the cost function by adjusting at least one of the intrinsic parameters.

6. The method of claim 1, further comprising adjusting at least one parameter of the at least one neural network based on the reprojection error.

7. The method of claim 6, wherein adjusting at least one parameter of the at least one neural network comprises applying an optimization algorithm to a cost function that relates the at least one parameter of the at least one neural network to the reprojection error,
wherein the optimization algorithm is configured to minimize the cost function by adjusting the at least one parameter of the at least one neural network.

8. The method of claim 1, wherein the at least one neural network includes a convolutional neural network.

9. The method of claim 1, wherein the intrinsic parameters of the camera include at least one of a focal length, a pixel size, a principal point, a skew coefficient, or a distortion coefficient.

10. The method of claim 1, further comprising:
determining that the camera is calibrated when the reprojection error satisfies a predetermined threshold.

11. The method of claim 1, wherein processing the first image and the second image using the at least one neural network comprises:
processing the first image using a first neural network to determine the depth of at least the portion of the first image; and
processing the first image and the second image using a second neural network to determine the transformation between the first image and the second image.

12. The method of claim 1, wherein determining the transformation between the first image and the second image comprises determining a transformation between a pose of the camera for the first image and a pose of the camera for the second image.

13. A vehicle, comprising:
a camera;
at least one processor; and
at least one non-transitory computer-readable storage media storing instructions which, when executed by the at least one processor, cause the at least one processor to perform operations comprising:
receiving a first image captured by the camera and a second image captured by the camera;
processing the first image and the second image using at least one neural network to:
determine a depth of at least a portion of the first image;
determine a transformation between the first image and the second image;
generating a projection image based on the depth of at least the portion of the first image, the transformation between the first image and the second image, and intrinsic parameters of the camera;
comparing the second image and the projection image to determine a reprojection error; and
adjusting at least one of the intrinsic parameters of the camera based on the reprojection error.

14. The vehicle of claim 13, wherein generating the projection image comprises:
applying the transformation to the depth of at least the portion of the first image to predict a depth of at least a portion of the second image; and
processing the predicted depth of at least the portion of the second image with the intrinsic parameters of the camera to generate the projection image.

15. The vehicle of claim 13, wherein comparing the second image and the projection image to determine the reprojection error comprises:
determining a distance between each point of the second image and a corresponding point of the projection image; and
combining the distance between each point of the second image and the corresponding point of the projection image to determine the reprojection error.

16. The vehicle of claim 13, wherein adjusting at least one of the intrinsic parameters of the camera comprises applying an optimization algorithm to a cost function that relates the intrinsic parameters to the reprojection error, wherein the optimization algorithm is configured to minimize the cost function by adjusting at least one of the intrinsic parameters.

17. At least one non-transitory computer-readable storage media comprising instructions which, when executed by at least one processor, cause the at least one processor to perform operations comprising:
 receiving a first image captured by a camera and a second image captured by the camera;
 processing the first image and the second image using at least one neural network to:
  determine a depth of at least a portion of the first image;
  determine a transformation between the first image and the second image;
  generating a projection image based on the depth of at least the portion of the first image, the transformation between the first image and the second image, and intrinsic parameters of the camera;
  comparing the second image and the projection image to determine a reprojection error; and
  adjusting at least one of the intrinsic parameters of the camera based on the reprojection error.

18. The at least one non-transitory computer-readable storage medium of claim 17, wherein generating the projection image comprises:
 applying the transformation to the depth of at least the portion of the first image to predict a depth of at least a portion of the second image; and
 processing the predicted depth of at least the portion of the second image with the intrinsic parameters of the camera to generate the projection image.

19. The at least one non-transitory computer-readable storage medium of claim 17, wherein comparing the second image and the projection image to determine the reprojection error comprises:
 determining a distance between each point of the second image and a corresponding point of the projection image; and
 combining the distance between each point of the second image and the corresponding point of the projection image to determine the reprojection error.

20. The at least one non-transitory computer-readable storage medium of claim 17, wherein adjusting at least one of the intrinsic parameters of the camera comprises applying an optimization algorithm to a cost function that relates the intrinsic parameters to the reprojection error,
 wherein the optimization algorithm is configured to minimize the cost function by adjusting at least one of the intrinsic parameters.

\* \* \* \* \*